United States Patent [19]  
Dobry

[11] Patent Number: 4,937,412  
[45] Date of Patent: Jun. 26, 1990

[54] METHODS OF HEATING WITH MICROWAVE SUSCEPTIBLE FLUIDS

[76] Inventor: Reuven Dobry, 87 Rolling Wood Dr., Stamford, Conn. 06905

[21] Appl. No.: 327,794

[22] Filed: Mar. 23, 1989

[51] Int. Cl.$^5$ .............................................. H05B 6/80
[52] U.S. Cl. .................... 219/10.55 M; 219/10.55 F; 219/10.55 E; 99/DIG. 14; 426/241
[58] Field of Search ............... 219/10.55 M, 10.55 R, 219/10.55 F, 10.55 E; 99/DIG. 14, 451; 426/241, 243

[56] References Cited

U.S. PATENT DOCUMENTS

| | | | |
|---|---|---|---|
| 4,283,427 | 8/1981 | Winters et al. | 426/107 |
| 4,316,070 | 2/1982 | Prosise et al. | 219/10.55 E |
| 4,439,656 | 3/1984 | Pelig | 219/10.55 E |
| 4,501,946 | 2/1985 | Nibbe et al. | 219/10.55 E |
| 4,625,089 | 11/1986 | Gies | 219/10.55 E |
| 4,743,726 | 5/1988 | Hughes et al. | 219/10.55 E |
| 4,795,649 | 1/1989 | Kearns et al. | 426/243 |

*Primary Examiner*—Philip H. Leung

[57] ABSTRACT

The methods of this invention employ fluids which include non-aqueous and relatively non-volatile components as permanent and reusable microwave susceptors. The fluids, effectively contained for their intended heating functions, convert microwave energy into thermal energy which is stored in the fluids and their containers. The stored energy is utilized for the purpose of heating a load object.

8 Claims, No Drawings

METHODS OF HEATING WITH MICROWAVE SUSCEPTIBLE FLUIDS

BACKGROUND OF THE INVENTION

1. Technical Field

This invention relates to microwave technology and, more specifically, to microwave susceptors; i.e. materials capable of generating thermal energy from microwave energy. Although solid materials have long dominated susceptor applications, liquid susceptors are gaining recognition as useful alternatives.

This invention relates to the usage of various liquid substances which possess low volatility and high stability as permanent and reusable microwave susceptors. It employs such materials to convert microwave energy to thermal energy in the form of stored heat suitable for a variety of applications in and out of the microwave. 2. Description of the Prior Art It is well known among practitioners of microwave cooking that, speed of preparation notwithstanding, microwave ovens produce results which are quite different from those obtained in conventional ovens. Microwaves heat food essentially throughout by acting upon microwave susceptible components such as water, salts, sugars and the like. Food components which are less microwave interactive do not absorb microwave energy as readily, but heat up by their close proximity to and admixture with receptive components in a constant process of thermal equilibration. In contrast, conventional ovens heat foods by conduction, radiation and convection from the outside in. This method of heating produces surface effects such as browning and crisping which are often desirable but not attainable in an all-microwave oven.

A few microwave ovens now offer added radiant or convective heat in attempts to simulate conventional ovens. Manufacturers of microwave cookware are also trying to address this need by specialized cooking utensils, described as browning grills or skillet browners, which feature microwave susceptible surfaces made of ferritic materials and the like, as described in U.S. Pat. Nos. 4,496,815 and 4,542,271. Similar considerations are being given to the development of cook-in packaging for foods by providing extra heat from microwave susceptors to promote crispness. The latter is exemplified by a variety of crisping boards, as cited in U.S. Pat. Nos. 4,267,420 and 4,258,086, which carry microwave susceptors based on vacuum-metallized or metal-sputtered polyester film, for such foods as french fries, fish sticks, pizza and the like.

It is clear that much attention has been given thus far to solid microwave susceptor materials. Solid materials, however, be they natural or man-made, cannot address all needs. Among microwave susceptors which are liquid, water is best known as the major microwave susceptible component of foods. Water has also been used as a supplemental source of microwave heat in various cooking or heating applications, as described in U.S. Pat. Nos. 4,501,946, 4,439,656, 4,316,070 and 4,283,427. However, water and other volatile liquids cannot practically serve as reusable sources of thermal energy for a number of reasons. First of all, they boil at temperatures which are of limited interest. Secondly, long before their boiling point is reached, they begin to evaporate, therefore being in need of frequent replacement. Thirdly, when confined, they are apt to build up pressures which cannot be safely controlled. Thus, the useful temperature range of water and aqueous liquids is essentially defined by the volatility and boiling point of water.

U.S. Pat. No. 4,795,649 by Kearns et al addresses the problem by the use of non-aqueous, organic liquids as sources of heat in a double-boiler cooking method. The liquids are microwave susceptible and relatively non-volatile capable of reaching temperatures not attainable commonly in microwave cooking. The liquids cited in the patent are essentially aimed at one specific application. However, microwave susceptible fluids are available in such a wide variety of dielectric and other physical properties that their full potential is yet to be realized not only for cooking but, even more so, for non-food applications.

In the field of health-care, for instance, there are many hot and cold compresses to choose from. Several portable compresses contain fluids or gels which must be precooled or preheated before use, as described in U.S. Pat. Nos. 3,885,403 and 3,780,537. Others derive their thermal effects from physical phenomena such as solution or crystallization as cited in U.S. Pat. Nos. 3,874,504 and 4,462,224. With the advent of microwave technology, some of the newer compresses are claimed to be preheatable in the microwave. They apparently contain gelled or relatively volatile aqueous compositions which can be damaged or rendered less effective by repeated use or excessive preheating. Since they require elaborate precautions and occasional reconditioning or regeneration, there is clear need for microwave reheatable devices which are safe, more forgiving and simpler to use.

In the area of leisure and recreation, reusable cold cubes have been available for many years, comprising fluids permanently encased in freezer-safe and puncture-resistant containers. There are no counterpart devices in the market for heating items or maintaining them hot, which use encapsulated liquids as sources of heat; that is, reusable "hot cubes". With the advent of microwave technology and the availability of liquid susceptors such items are now closer to reality.

Accordingly, the object of this invention is to provide greater opportunity for employing liquid susceptors as permanent and reusable sources of microwave generated thermal energy for food and non-food applications. A further object of the invention is to provide the microwave generated thermal energy in the form of stored heat available for application in the oven, during the microwaving, or outside the oven, after the microwaving.

SUMMARY OF THE INVENTION

The present invention relates to methods of heating which employ microwave susceptible fluids as sources of thermal energy. The preferred fluids are substantially non-aqueous and relatively non-volatile, stable and reusable over broad temperature ranges, exceeding the capabilities of water and other commonly known liquid susceptors. The preferred fluids, suitably contained, are subjected to microwave energy sufficient to generate and store heat in the fluids and their means of containment. The heat so generated is used for performing various heating functions during the microwaving or after the microwaving.

DESCRIPTION OF THE PREFERRED EMBODIMENTS

In order to be widely applicable, microwave susceptor fluids should possess low volatility, i.e., negligible vapor pressure at 25° C. and boiling points, at normal barometric pressure, well above 150° C. Fluids of choice should be highly stable at elevated temperature, at least up to 300° C. In addition, they should be relatively low in viscosity, say 50 to 100 centistokes at 100° C. and preferably lower, in order to transmit heat more effectively to their surroundings by convection as well as conduction.

Among materials which meet such requirements, but not excluding others, are: ethylene glycol and its polymers, propylene glycol and its polymers, glycerol and its polymers and other polyhydric compounds and their polymers. Microwave susceptibility is also exhibited by chemical derivatives of such compounds. Among them are: esters of acetic acid and longer chain aliphatic acids, ether side chains derived from alcohols and polyethers. It should be noted that these compounds need not necessarily be liquid at room temperature, i.e., at 25° C., for the purpose of this invention. They can be solid, semi-solid or even supercooled liquid at room temperature, but meltable at some elevated temperature for their proper disposition and usage as fluid susceptors. In other words, they only need to be fluid at their working temperatures. Latent heat consumed in the melting of such compounds can, of course, be recovered, sometimes as a welcome bonus, en route back to the solid state.

Microwave susceptible liquids vary greatly in their physical properties depending on molecular weight and structure. Compounds low in molecular weight and abundant in hydroxyl and ether groups exhibit high microwave susceptibility, high water solubility and hygroscopicity. As might be expected, their properties change as the molecular weight and structure change. At the opposite end, compounds high in molecular weight and low in hydroxyl or ether groups exhibit lower microwave susceptibility and essentially water immiscibility. Other factors such as specific heat, specific gravity, viscosity, volatility and chemical stability also have to be considered and, occasionally, traded off. That provides the practitioner with substantial latitutde in selecting microwave susceptible fluids, either individually or in compatible mixtures, to suit any specific purpose.

High temperature applications require the use of non-volatile non-aqueous fluids as susceptors. However, that does not imply total exclusion of water for lower temperatures. Non-aqueous fluids which heat up faster than water do not necessarily do so because they absorb more microwave energy per unit weight, but because their specific heat, ranging from 0.5 to 0.8 cal/g° C., is substantially lower than that of water at 1.0 cal/g° C. Hence, they are capable of storing less energy than water, per unit weight, at an equal rise in temperature. In certain cases it may be advantageous to add some water to a water miscible non-aqueous fluid in order to lower its viscosity and improve its ability to store heat. This should be done, however, so that the higher volatility which ensues is not detrimental to the particular application. In any case, it is preferable that water be present in the composition at less than 30% of the combined weight, and in most cases substantially less than 30%.

Microwave susceptible fluids must be properly contained to serve as sources of heat. Means for their containment may comprise hermatically sealed vessels, preferably semi-rigid and flexible enough to allow for the expansion of fluid and entrapped gases as the temperature rises. They can also be solid materials, coherent or particulate in which the fluid is impregnated, dispersed, subdivided or otherwise disposed. Porous materials impregnated with fluid retain the fluid by capillary action. However, it may be necessary to restrict the amount of fluid relative to the host material, so that differences in thermal expansion between materials do not result in the expulsion of fluid out of the host material at elevated temperature. The fluid and its means of containment should have sufficient heat capacity, i.e., mass and specific heat, to serve as a reservoir of thermal energy for applications after microwaving as well as during microwaving. Means of containment may include accessory materials and special designs providing portability, means of attachment to the heated object and the like. They may also include selective thermal insulation in order to deliver heat in a preferred direction or pattern. In summation, any means of containment and accessories consistent with a particular application may be used with this invention.

Operating temperatures of interest in this invention may be as low as 50° C., i.e., somewhat above body temperature, for heat application, by pads and the like, to human and animal bodies. They can also extend into higher temperatures, well above the boiling point of water for application to foods and inanimate objects. The upper reaches of temperature are essentially limited only by the stability of the fluids, by the materials which contain them and by the magnitude of the heating load. The latter includes losses of heat to cooler surroundings. For instance, a liquid susceptor with a boiling point of 500° C. which is contained in ceramic materials, selectively insulated and intended for a small load, can produce temperatures of 200° C. and beyond.

Addressing matters of safety, the preferred fluids of this invention are mostly non-toxic and many are food grade materials. Therefore, they do not pose any serious hazard in case of accidental abuse or spillage. As discussed earlier, the upper limits of operating temperatures are determined essentially by the microwave susceptibility of the fluid in dynamic balance with heat given off. Since the latter includes useful heat delivered to a load as well as wasted heat lost to the surroundings, the dynamic balance which ensues will determine the temperature maximum attainable in some applications, i.e., self-limited temperature in effect, if not by design. Other cases where runaway temperatures and overheating pose a problem will require adherence to operating instructions regarding microwave time and power, common sense precautions of checking temperatures before use and added temperature indicating capabilities whenever possible.

Although cooking or heating of foods is not the primary object of this invention, it may find some application in cases where addition of a cooking oil or frying per se is neither desirable nor acceptable. One such example is the reheating of a fully cooked entree. Others relate to the reconstitution of frozen or refrigerated baked items such as pizza and the like. Some applications, either food and non-food, may take place in the microwave oven wherein heat stored in the fluid and means of containment is put to use immediately. Other applications can begin in the microwave but the heating function is fully realized after the microwaving. These and other advantages of the invention, not the least of which is in providing for greater utilization of the microwave oven, will become more evident from the examples which follow.

EXAMPLE 1

This example demonstrates a method of therapeutic heating for parts of the body.

A hot water bottle made of rubber, measuring 6"×4¼" with a thickness of ¼" around its periphery, was filled with 5 ounces of tripropylene glycol. The bottle was stoppered carefully free of excess air, and permanently sealed with silicone rubber. After microwaving at 500 watts for 45 seconds, its surface temperature rose from 65° F. to 135° F. The bottle was placed in a freezer overnight where it remained soft and its contents fluid. After microwaving at 500 watts for 1 minute and 30 seconds its surface temperature rose from 0° F. to 135° F. Therapeutic cooling or heating was thus possible, quite simply, with one and the same bottle permanently filled with liquid.

EXAMPLE 2

Particulate means of containment are described in this example for a heating pad made according to the invention.

Alumina is available commercially in particulate and highly porous forms. One such material was chosen in the form of balls measuring approximately ¼" in diameter. Five 40-gram aliquots of this material were impregnated with various melted polyethylene glycols ranging in molecular weight from 600 to 1450. Each aliquot was subjected to several heating cycles in the microwave, followed by cooling, to enhance the penetration of the glycol into the porous alumina. Following draining, rinsing with hot water, to remove excess glycol from the surface, and drying in a conventional oven at 220° F., the combined weight of the treated balls was determined to be 322 grams. The treated alumina was thus shown to carry a load of glycol amounting to 60% by startinq weight or 38% by finished weight.

The treated balls were mixed and sewn into a cloth bag comprising plain fabric on one face and quilted fabric on the other. After 3 minutes in the microwave at 500 watts, the bag felt warm to the touch. It was then used as a heating pad on its plain cloth side, with the quilted side serving as thermal insulation, thus retaining its heat for at least 20 minutes. The same bag was also used as a cold pack starting from the freezer and then reheated on demand, in the microwave, back to its working temperature as heating pad.

EXAMPLE 3

This example demonstrates a method for keeping food hot in a feeding dish.

A feeding dish for babies keeps food warm by a built-in reservoir which is normally pre-filled with hot water. One such dish was filled instead with about 18 ounces of polypropylene glycol, having a molecular weight of 625, and then capped securely. The dish was microwaved at 700 watts for 3 minutes whereupon its temperature rose from 65° F. to 180° F. This type of cycling, up and down in temperature was repeated, many times, using the same fluid, i.e., without any need for emptying and refilling the reservoir and merely by use of the microwave oven.

EXAMPLE 4

Reusable "hot cubes" are fabricated according to this invention from ceramic materials.

A piece of ceramic was fabricated in the form of a hollow sphere measuring about 2" in diameter and weighing 110 grams, with one opening ¼" in diameter. The sphere was made with a ceramic glaze on its outer surface. About 3 g of melted polyethylene glycol, 900 in molecular weight, was poured into the opening and allowed to soak into the ceramic from within. The treated sphere was microwaved for 1½ minutes at 500 watts whereupon it became extremely hot to the touch, exact temperature unknown, and then retained its heat for 10–15 minutes under ambient conditions. In an insulated pack the sphere would remain hot much longer and in effect serve as a "hot cube".

EXAMPLE 5

A method of heating is described in this example for reheating food and keeping it hot.

An open dish, 1¾" deep with sloping walls, measures 4" at its base and 5¼" at its top. One, ear-shaped handle is attached to its rim. The dish is made of a white ceramic material. Ceramic glaze covers all surfaces but its flat bottom, the latter being not only bare but also porous. The dish was microwaved for several minutes and found to be cool to the touch, i.e., microwave safe.

Polyethylene glycol with a molecular weight of 600 was melted in the microwave and then soaked into the bottom of the dish, as much as the latter would absorb, and excess fluid was blotted and rinsed off. When the treated dish was microwaved for 3 minutes at 500 watts its floor reached temperature estimated at 250–300° F., while its walls and handle were cool enough to be handled. Food microwaved in this dish thus received heat from the bottom in addition to normal microwave heat within the food. It also remained hot longer from the thermal energy stored in the dish.

EXAMPLE 6

This cooking utensil with microwave heated walls simulates the performance of a "Dutch Oven".

A casserole dish, with a bottom piece 7" in diameter×1¼" deep and a matching domed cover, is made of red clay. The inner surface of the bottom piece is sealed with a clear ceramic glaze while other surfaces are bare and liquid absorbent. Bare surfaces, all but the top handle, were treated with melted polyethylene glycol, having a molecular weight of 1450, and then painted with glycerol mono-oleate, the first being water miscible but the more microwave susceptible fluid of the two, and the second being water immiscible and therefore water repellant.

The dish was microwaved empty at 500 watts reaching an inside temperature of 300° F. in 9 minutes. This would clearly be impossible to achieve with such a dish untreated or solely by microwaving a water-rich food item. Thus the cooking performance of the treated casserole would in effect be more akin to a conventional oven than to pure microwaving.

EXAMPLE 7

A method of heating is described according to this invention for serving melted butter and keeping it hot for an extended period.

A ceramic cup with handle, 3" in diameter and 3½" deep, is made of liquid absorbent red pottery. The cup is glazed inside with white ceramic enamel which extends over the rim and down the upper portion of the outer wall. Bare surfaces, all but the handle, were treated with melted polyethylene glycol with a molecular weight of 600, excess fluid being blotted dry following several heating cycles in the microwave. The cup was filled with a stick of refrigerated butter. Upon microwaving, the butter melted promptly by high heat from the walls of the cup and remained melted for at least 30 minutes afterwards. A utensil of this type can thus be used for melting, holding and dispersing hot a variety of substances which by themselves are relatively non-responsive to microwave energy.

EXAMPLE 8

This example demonstrates a heating pad with means of attachment to a body limb being treated.

An adult-size sphygmomanometer with a Velcro cuff, made by the W.A. Baum Co of Copiaque, N.Y., was modified by removal of the pressurizing bulb, manometer and connecting tubing assembly. The rubber balloon, normally filled with air, was filled with 3 ounces of tetraethylene glycol, freed of excess air, and then sealed with silicone rubber. The modified and re-assembled unit was placed in a microwave oven at 500 watts for 2 minutes, and then used as a heating pad around the arm.

EXAMPLE 9

This example discloses a method of preheating a dinner plate or serving platter before its use at the table.

A ceramic plate, 8¼" in diameter with raised side walls, is glazed on all surfaces except for its flat bottom. The bottom of the plate was impregnated with melted polyethylene glycol, 600 in molecular weight. The plate was preheated in the microwave for several minutes and then used for serving a hot food. Heat stored in the plate maintained the food hot longer than a cold plate would. Because the heat was localized on the bottom, under the food, the rim of the plate was only warm and comfortable enough to be handled.

EXAMPLE 10

The methods described in this example and the two following relate to a hot-melt composition which is microwave responsive.

A piece of bleached cardboard was folded over and glued together by a hot melt compound. Glycerol was then painted on the outer surfaces of the folded board, above and below the point of hot melt contact. Microwaving the combination for one minute at 500 watts generated heat in the glycerol which softened the hot melt and allowed the glued board to come apart.

EXAMPLE 11

Fumed silica was moistened with glycerol and worked into a smooth gel-like consistency. The mixture was microwave susceptible, due to the glycerol, imparting its heat to any surface on which it rested. Hot melt by itself is not microwave susceptible. However, when melted by conventional heating and admixed with the glycerol-silica combination, the resulting composition was responsive to microwaving, cycling between the melted and solid state in response to microwave energy and ambient cooling, respectively.

EXAMPLE 12

The composition of EXAMPLE 11 was used as a modified hot melt for bonding together folded cardboard, as in EXAMPLE 10. Upon microwaving for one minute the hot melt softened and the bond was broken. This combination of materials and internal heat generation suggests the possibility of cook-in food packaging made to be self-opening in response to microwaving, if desired.

EXAMPLE 13

This example and the two following demonstrate methods of heating which convert microwave transparent ceramic tiles into reusable sources of microwave generated thermal energy.

A commercially available wall tile made of white ceramic is manufactured glazed on its top side and absorbent to fluid on its bottom side. The tile is a 6 inch square with a thickness of 3/16". Triglycerol mono-oleate was applied to one half of the tile on its absorbent bottom. The treated tile was then subjected to repeated microwaving and cooling. Extreme temperatures, well above 250° F., developed upon microwaving only in the treated half, and not in the other.

EXAMPLE 14

A tile similar to that of EXAMPLE 13 was treated with 10 g of melted polyethylene glycol, having a molecular weight of 1000, within the bounds of a centrally located 5" circle. The bottom of the tile was then sealed with silicone 116 made by G.E. which cured at ambient temperature and humidity to a self-leveled, smooth surface. When the tile was microwaved at 500 watts, its mid-section reached 300° F. in 2¼ minutes, while its untreated margins and corners remained relatively cool to the touch. The preheated tile was used to reconstitute a frozen baked item in the microwave which came out crisp on its bottom. The same tile, not treated, produced reconstituted baked items with a soggy consistency.

EXAMPLE 15

The bottom of an 8" floor tile was impregnated with polyethylene glycol, having a molecular weight of 400, sealed with silicone rubber and covered with ⅛" of ceramic fiber insulation. Microwaving at 500 watts for 3½ minutes raised the temperature of the tile on its top side from 65° F. to 300° F. The same tile was used in three different ways:
a. Unheated, as a trivet, for supporting utensils containing hot food, when it is permissible or desirable to let them cool down.
b. Following preheating in the microwave, as a hot trivet, for supporting utensils which need to be maintained hot.
c. As a preheated surface for microwaving items which require conducted heat at the surface of contact, e.g., pizza, baked goods, sandwiches and the like.

EXAMPLE 16

A ceramic baking pan with microwave preheated walls is disclosed according to this invention.

A bread loaf pan made of red clay, measuring 10¾"×5¼"×3¼" deep, is glazed on the inside only. All other surfaces, including two side handles are bare and liquid absorbent. One half of the pan was treated with melted polyethylene glycol, having a molecular weight of 600, and the other with glycerol monooleate. Microwaving produced much higher heat in the first half than the second. This demonstrated that the amount of heat can be regulated by choice of microwave susceptible fluids. Heat generated uniformly in the wall of the pan is likely to improve the baking process in the microwave bringing it closer to the performance of a conventional oven.

EXAMPLE 17

This disclosure relates to a method of reconstituting and serving a baked item in a microwave preheated skillet.

An 8½" skillet made of red clay, with slanted walls and one side handle, is glazed on the inside only. All surfaces but the handle, which are bare and liquid absorbent, were treated with melted polyethylene glycol, 600 in molecular weight. The skillet was preheated for several minutes in the microwave and then returned to the microwave for reconstituting a small frozen pizza to eating temperature. The pizza was cut and served on the skillet which maintained it hot and crisp. A similar pizza microwaved on microwave safe stoneware came out with a soggy bottom.

EXAMPLE 18

This example and the one following demonstrate other versions of reusable "hot cubes".

A disc made of porous terra cotta pottery, tradenamed The Bakery, is normally preheated in a conventional oven and then wrapped together with bread and rolls, maintaining them hot in a serving basket. The same disc was impregnated with a mixture of acetylated monoglycerides made by Eastman Kodak. These substances are food grade emulsifiers which are also microwave susceptible. When the treated disc was microwaved for 3-4 minutes, it reached a temperature exceeding 200° F. It was thus used safely as a source of heat in direct contact with various baked goods.

EXAMPLE 19

A 2-ounce bottle made of polypropylene, equipped with a polypropylene screw cap, was filled with 70 grams of tetraethylene glycol. The bottle was capped essentially free of excess air and permanently sealed with silicone rubber. A temperature sensitive adhesive tape was then applied prominently on the wall of the bottle to indicate surface temperature. When the bottle was microwaved at 500 watts for 45 seconds, its surface temperature rose from 60° F. to 190° F. after brief equilibration. Several such heated bottles were used as "hot cubes" to maintain food items hot in an insulated container.

The foregoing description is for the purpose of teaching the person of ordinary skill in the art how to practice the present invention. It is not intended to detail all of those obvious variations and alternatives which will become apparent to the skilled worker upon reading the description. It is intended, however, that all such variations and alternatives be included within the scope of the present invention which is defined by the following claims.

I claim:

1. A method of heating a load object comprising the steps of:
   (a) employing a microwave susceptible material which is fluid at a predetermined elevated operating temperature as permanent and reusable microwave susceptor, said microwave susceptible material including a non-aqueous and non-volatile component at a concentration of 70% by weight or higher, said component being a polyhydric compound, a polymer of polyhydric compounds or a chemical derivative of either;
   (b) enclosing said microwave susceptible material in a closed and flexible means of containment;
   (c) supplying microwave energy to the enclosed material sufficient to generate and store thermal energy in the material and the means of containment; and
   (d) placing said load object at a proximity with said means of containment sufficient to heat the load object by the stored thermal energy.

2. The method of claim 1 wherein said component has a boiling point of 150° C. or higher at normal barometric pressure.

3. The method of claim 1 wherein said component is fluid at said elevated operating temperature and at room temperature.

4. The method of claim 1 wherein said component is fluid at said elevated operating temperature but not at room temperature.

5. The method of claim 4 wherein said component is a solid, a semi-solid or a supercooled liquid at room temperature.

6. The method of claim 1 wherein said microwave susceptible material comprises a plurality of non-aqueous and non-volatile components.

7. A method of heating a load object comprising the steps of:
   (a) employing a microwave susceptible material which is fluid at a predetermined elevated operating temperature as a permanent and reusable microwave susceptor, said microwave susceptible material including a non-aqueous and non-volatile component at a concentration of 70% by weight or higher, said component being a polyhydric compound, a polymer of polyhydric compounds or a chemical derivative of either;
   (b) containing said microwave susceptible material in porous and permeable means of containment, the material being absorbed and retained therein by capillary action;
   (c) supplying microwave energy to the contained material sufficient to generate and store thermal energy in the material and the means of containment; and
   (d) placing said load object at a proximity with said means of containment sufficient to heat the load object by the stored thermal energy.

8. The method of claim 7 wherein said porous and permeable means of containment is a solid in the form of small discrete particles, large segments of coherent matter or combinations thereof.

* * * * *